Oct. 29, 1968    C WALTON MUSSER    3,407,902
LUBRICATION SYSTEMS

Filed March 15, 1966    2 Sheets-Sheet 1

Inventor
C. Walton Musser
By his Attorney
Carl E. Johnson

Patented Oct. 29, 1968

3,407,902
LUBRICATION SYSTEMS
C Walton Musser, Palos Verdes Estates, Calif., assignor to United Shoe Machinery Corporation, Boston, Mass., a corporation of New Jersey
Filed Mar. 15, 1966, Ser. No. 534,514
8 Claims. (Cl. 184—6)

ABSTRACT OF THE DISCLOSURE

An all-attitude lubricating device comprising a grease container having circumferentially spaced feed holes in its side wall and at least one axial return hole for recirculated lubricant, and a rotary paddle or ejector means eccentrically mounted in the container and having an end disposed for circumferential sweeping and radial pumping movements relative to the feed holes, whereby a surface of the container may guide the flow of ejected grease to adjacent mechanism. When the device is used in a harmonic drive actuator, for example, the container may fit within a flexspline, and the ejector may be operatively connected to a plain eccentric bearing formed on a coaxial input shaft.

---

This invention relates to force feed lubricating systems. More particularly the invention is concerned with providing improved lubricant pumping means adapted to be automatically operated in the course of actuating the parts requiring lubrication and regardless of their orientation. Although the invention as herein shown for purposes of illustration is applied to a harmonic drive type of speed changer, it will be understood that application of the invention in several aspects is not thus limited, nor is it limited to speed changers or, indeed, to any special type of mechanism.

A large variety of mechanical units are preassembled for installation and operation in different postures. Because of their unpredictable positions when mounted, they must be capable of rendering long service in whatever position or positions their parts ultimately may function. In these circumstances a frequently critical factor in insuring superior longevity and performance, especially of interengaging working elements such as gears, is the constant availability of the correct lubricant in proper amounts.

It is accordingly a principal object of this invention to provide an economical force feed lubricating pump adapted to operate effectively in all possible positions.

Another object of the invention is to provide an improved, nonfluid-pressurized grease feeder actuatable by a rotary portion of the mechanism to be lubricated and capable of reliably circulating grease thereto at a predetermined rate over an extended period of operation.

A specific further objective of the invention is to provide a simple and reliable device for continuously lubricating the wave generator bearing and cooperating spline teeth of a harmonic drive type speed changer.

To these other ends, a feature of the invention resides in the combination, with mechanism to be lubricated and including a rotary member, of a cylindrical lubricant container surrounding the member and having circumferentially spaced feed holes, and a lubricant ejector eccentrically carried by the member and having an end portion arranged to thrust the lubricant radially through feed holes in the container for circulation to the mechanism. As herein illustrated the ejector is in the form of a vane or paddle rotatable on an eccentric hub of a harmonic drive input shaft, the end of the ejector being disposed closely adjacent to the feed holes and on the inside of the container which is itself mounted within the harmonic drive flexspline for small radial clearance with its minor axis. On encountering grease in the container, the ejector is restrained from rotating with the input shaft and thereupon radially reciprocates to urge the grease to flow in the annular space between the flexspline and the container and thence to the bearings and other parts requiring lubrication.

The foregoing and other features of the invention together with novel details in construction and parts will now be more particularly described in connection with an illustrative embodiment and with reference to the accompanying drawings, in which.

Figure 1:
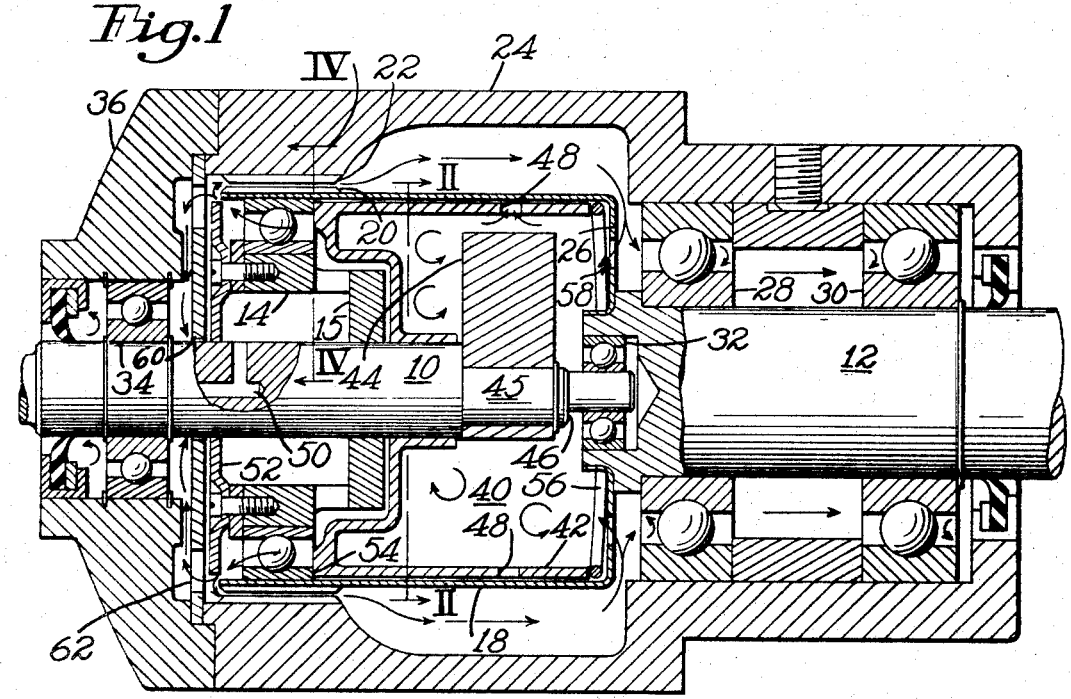
FIG. 1 is an axial section of a harmonic drive type speed reducer incorporating my novel lubricating system, flow patterns being indicated by arrows.
Figure 4:
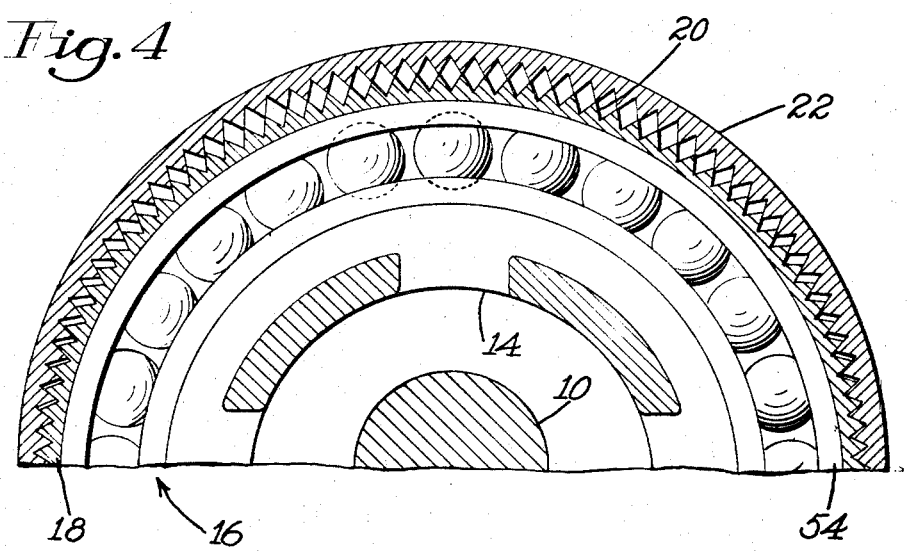
FIG. 4 is a section taken on the line IV—IV of FIG. 1, the major axis of the flexspline being indicated in a horizontal plane.

The mechanism selected for illustration of the invention is a speed reducer of the harmonic drive type, for instance as disclosed in detail in United States Letters Patent No. 2,906,143, issued Sept. 29, 1959 on an application filed in my name. It comprises an input shaft 10, an output shaft 12, a wave generator 14 (which may be of ellipsoidal shape) having a hub 15 driven by the input shaft and having a wave generator bearing generally designated 16 (FIG. 4) for rotatably imparting the ellipsoidal shape to a tubular flexspline 18. Accordingly, the major diameter of the flexspline is rotated to cause points of circumferential engagement of its flexspline teeth 20 with a greater number of correspondingly shaped spline teeth 22 formed internally of a housing 24 (FIG. 1). The flexspline 18, in this case serving as the harmonic drive output element, is cup-shaped and has its closed or diaphragm end 26 secured to the output shaft 12 which is journaled in bearings 28, 30 in the housing. The input shaft 10 preferably has its inboard end fitted with a pilot bearing 32 in the inboard end of the output shaft 12 and is also supported in a bearing 34 in an end cap 36 affixed to the housing 24. Thus the exemplary mechanism includes several working parts and bearings needing lubrication in any and all positions the unit may be employed.

Figure 3:
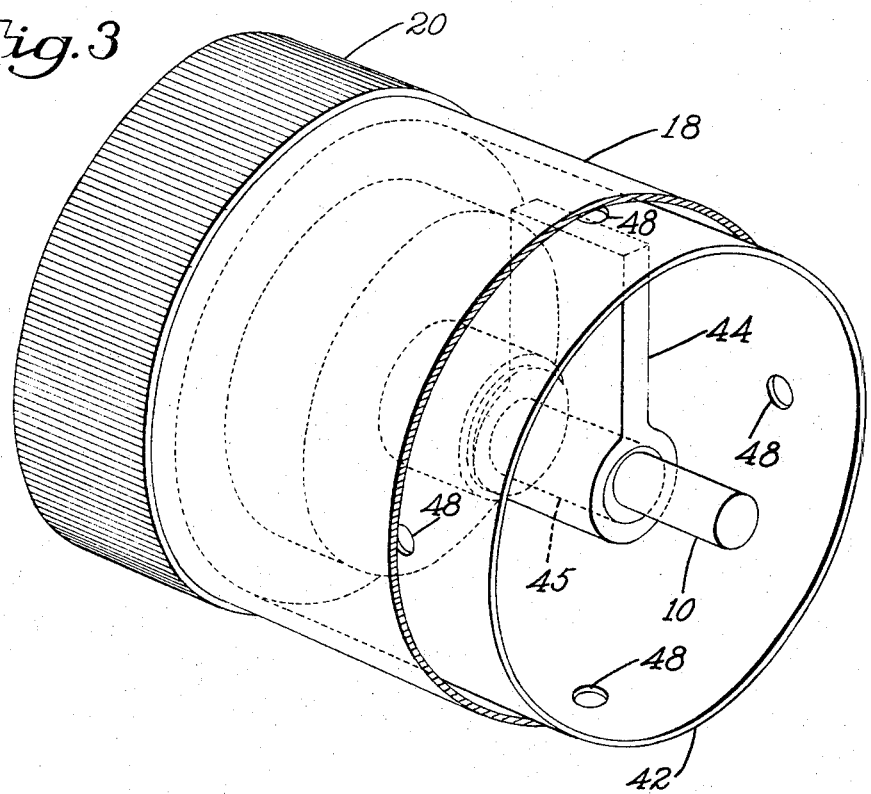
FIG. 3 is an enlarged perspective view of the lubricating means in relation to a portion of a flexspline of the reducer.

The lubrication system now to be explained may be actuated by operative connection to any suitable rotating member. In this instance the flexspline 18, being hollow and cylindrical provides centrally available space 40 for a cup-like container 42, tubular but not necessarily circular in section, having a diameter slightly smaller than the inside diameter of the flexspline and holding a large reservoir of grease which is to be force fed and circulated to the working parts. Accordingly, as shown in FIGS. 1 and 3, for pumping the grease in metered fashion to meet the needs of the parts as will be described, an ejector 44 in the form of a rigid, light weight impeller vane or paddle has one end formed with a plain bearing and mounted eccentrically on a reduced portion 45 of the input shaft 10. Preferably a washer and a snap ring 46 in a groove of the shaft 10 holds the ejector against a shoulder thereon. The grease lubricated ejector 44 extends radially in the container 42. If there were no grease encountered therein, the ejector would rotate with the shaft 10, but being restrained from such rotation by resistance afforded by the grease supply, the ejector radially reciprocates. The outer end of the ejector, by reason of the eccentric mounting, is caused to travel radially outward in a pumping stroke extending very nearly to circumferentially spaced feed holes 48 formed in the container 42.

Merely as an indication of one lubricator arrangement in a harmonic drive reducer incorporating a flexspline of about 3" diameter and on the order of 3¾" length, the ejector had a radial displacement of about 0.10" leaving a minimum clearance of about 0.013", its axial length was about 0.8", and the container feed hole diameters were on the order of 1/16". The feed holes 48 will of course be of a size and shape selected to suit particular rates of pumping desired.

Unlike most grease feeders the lubricating system is not dependent on fluid pressurizing to insure feeding and circulation of grease. In fact, as indicated in FIG. 1, a breather vent 50 is formed in the shaft 10 and has radial communication with the chamber inside of a vent shield 52 (FIG. 1) affixed on the wave generator. This shield has minimal clearance with the shaft 10 and provides centrifugal action for directing grease emitting from the wave generator bearing 16 to the spline teeth 20, 22. To get to the bearing 16 the grease extruded through the holes 48 by the pumping strokes of the ejector spreads axially in the annular space between the container 42 and the inside of the flexspline 18. This spreading is expedited, in the case of harmonic drive, by the circumferential wave travel at the minor axis of the flexspline. At the base of the container 42, which is urged against an outer race 54 (FIGS. 1 and 4) of the bearing 16 with fairly uniform pressure by a rectangular shaped, axially biased spring 56 (FIGS. 1 and 2) reacting on the shaft 12, a portion of the lubricant passes between the outer race 54 and the flexspline, and a portion is carried by the gyrating interface of the race to pass into and through the rolling elements of the wave generator bearing 16. The vent shield 52 thereupon throws the grease out to the teeth 20, 22, excess being pumped past the lip of the cup and passing axially to lubricate the bearings 28, 30 and return to the reservoir 40 via diaphragm holes 58. Preferably, to insure that the input bearing 34 is lubricated, especially if the assembly be operated in input shaft-up position, a stationary plate 60 (FIG. 1) clamped between the cap 36 and the housing 24 is formed with holes 62. The plate 60 has a central bore providing clearance with the input shaft 10 and accordingly lubricant may pass from the bearing 34 to be slung outwardly toward the teeth 20, 22.

Figure 2:
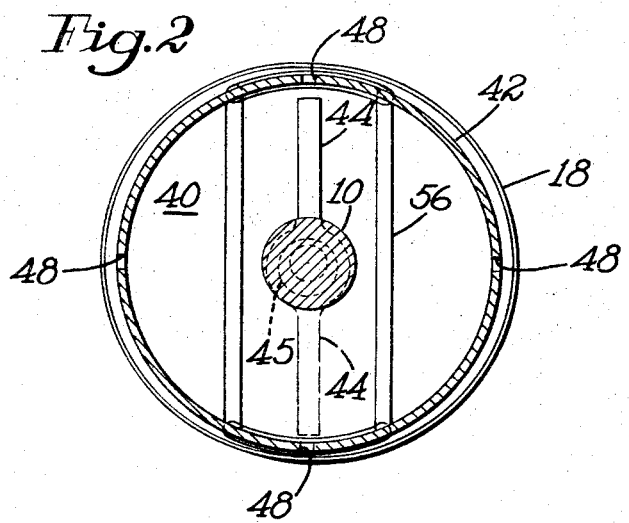
FIG. 2 is a section taken on the line II—II of FIG. 1 and showing a lubricating ejector in two extreme positions of operation.

From the foregoing description it is believed that operation of the lubricating system will be clear. The ejector may be driven by another rotary element such as the output shaft when desired. Numerous other details may be varied to accord with individual applications without departing from this invention. A salient point to be noted is that, despite omission of fluid pressure, the ejector 44 will rotatively seek out grease in the container 42 when the supply diminishes and air pockets exist until such time as rotation of the ejector is resisted by an accumulation of grease whereupon pumping action by radial strokes of the ejector resumes. FIG. 2 shows an inactive (i.e., nonpumping) position of the injector in full lines and an active position in dash lines; a "shot" of grease would be fed vertically downward in this latter illustration. The container 42 is prepacked with grease at assembly, replaceable grease containers 42 of this same type being available for easy substitution when needed. By reason of its simple structure the lubricating mechanism is inexpensive and easily adapted for operation in various mechanisms to assure long wear.

Having thus described my invention, what I claim as new and desire to secure by Letters Patent of the United States is:

1. A force feed lubricating system for mechanism having a rotating member comprising a tubular lubricant container adapted to be mounted axially to receive the member and having circumferentially spaced feed holes formed in a side wall of the container, and an ejector means eccentrically carried by the member and rotatable thereon, said means having an end disposed for radial and circumferential sweeping movements relative to said container holes to thrust lubricant radially through the holes for circulation to the mechanism.

2. A lubricating system as set forth in claim 1 wherein the ejector means is in the form of a single rotary vane having an inner end formed with an eccentric bearing for receiving said member and an outer end arranged and adapted, on encountering resistance to rotation from lubricant in the container, to exert a radial pumping stroke extending to near contact with the inside of the container in the vicinity of said feed holes.

3. An all-attitude greasing device comprising a rotary shaft having an eccentric plain bearing, a tubular grease container coaxially mounted on the shaft and having circumferentially spaced feed holes and at least one axial return hole for the grease to be recirculated, and an ejector mounted for rotation with said shaft on the eccentric bearing and having a radial length and movement adequate to force grease radially outward through the feed holes upon rotation of the shaft, the radial motion of the ejector being caused by impedance of its rotation on encountering grease within said container.

4. Lubricating means for use in a harmonic drive unit of the type including a circular spline, a flexspline, and a wave generator including a bearing for imparting a wave of radial deflection to the flexspline, said lubricating means comprising a cup-shaped grease container mounted in the flexspline in annularly spaced relation and having radial feed holes, an ejector rotatably mounted for radial reciprocation in the container and having an end extending in operative relation to the feed holes, and a resilient means for axially urging the container into engagement with the wave generator bearing.

5. Lubricating means for use in a harmonic drive of the type including a circular spline, a flexspline, a wave generator including a bearing for imparting a wave of radial deflection to the flexspline, and a rotary member for coaxially driving one of the circular spline, flexspline and wave generator, said lubricating means comprising a grease container mounted in the flexspline in annularly spaced relation and having radial feed holes, an ejector rotatably carried on an eccentric bearing formed on the rotary member and having an end extending in operative relation to the feed holes, and means for axially retaining an end of the container in close proximity with the wave generator bearing.

6. Lubricating means as set forth in claim 5 wherein a shield is secured to the wave generator and extends radially on the side of the wave generator bearing remote from the container to direct lubricant to the spline teeth of the circular spline and flexspline.

7. Lubricating means as set forth in claim 6 and further characterized in that a stationary plate is disposed adjacent to the shield and is formed with outer holes to direct lubricant therefrom to other parts of the drive, and is formed with an inner hole to redirect lubricant to the shield.

8. A greasing device comprising a cylindrical grease container having circumferentially spaced feed holes, and grease ejecting means mounted in the container for rotation on an axis eccentric to that of the container, said means including a vane one end of which is formed with a plain eccentric bearing concentric with said axis, said vane being impeded by engagement with the grease and radially reciprocable to pump it through said holes.

References Cited

UNITED STATES PATENTS

| | | | |
|---|---|---|---|
| 1,693,214 | 11/1928 | White | 184—27 X |
| 1,767,515 | 6/1930 | Davis | 184—27 X |
| 1,900,745 | 3/1933 | Sutter | 184—27 X |
| 3,196,713 | 7/1965 | Robinson | 74—640 |

LAVERNE D. GEIGER, *Primary Examiner.*

E. J. EARLS, *Assistant Examiner.*